United States Patent
Cantor et al.

(10) Patent No.: US 8,914,303 B2
(45) Date of Patent: Dec. 16, 2014

(54) SYSTEM AND METHOD FOR DIRECT MANIPULATION OF A TRIANGULAR DISTRIBUTION OF INFORMATION USING A GRAPHICAL USER INTERFACE

(75) Inventors: Murray Robert Cantor, Westwood, MA (US); Paul Michael Matchen, Mamaroneck, NY (US); Vadakkedathu Thomas Rajan, Briarcliff Manor, NY (US); Clay Edwin Williams, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 1463 days.

(21) Appl. No.: 12/190,905

(22) Filed: Aug. 13, 2008

(65) Prior Publication Data
US 2010/0042447 A1 Feb. 18, 2010

(51) Int. Cl.
| | |
|---|---|
| *G06Q 40/06* | (2012.01) |
| *G06Q 40/00* | (2012.01) |
| *G06Q 40/04* | (2012.01) |
| *G06Q 30/08* | (2012.01) |
| *G06Q 40/02* | (2012.01) |
| *G06Q 10/00* | (2012.01) |
| *G06T 11/20* | (2006.01) |

(52) U.S. Cl.
CPC ............... *G06Q 10/00* (2013.01); *G06Q 40/00* (2013.01); *G06T 11/206* (2013.01)
USPC .................. 705/35; 705/36 R; 705/37; 705/38

(58) Field of Classification Search
CPC ....... G06Q 40/00; G06Q 40/06; G06Q 40/04; G06Q 10/0637; G06Q 10/06; G06Q 30/08; G06Q 40/02
USPC ........ 345/440, 629, 642; 705/7, 35, 36, 36 R, 705/38, 7.17, 37; 716/2; 715/227, 765, 810, 715/833, 782, 839; 702/129; 700/29; 382/284
See application file for complete search history.

(56) References Cited

U.S. PATENT DOCUMENTS

| | | | | | |
|---|---|---|---|---|---|
| 5,414,809 | A | * | 5/1995 | Hogan et al. ................... | 715/765 |
| 5,519,818 | A | * | 5/1996 | Peterson ........................ | 345/642 |

(Continued)

FOREIGN PATENT DOCUMENTS

| | | | | | |
|---|---|---|---|---|---|
| JP | 2004151331 | | * | 5/2004 | ............... G09G 3/36 |
| WO | WO 2006/058155 | | * | 6/2006 | ............. G01R 27/28 |

OTHER PUBLICATIONS

Oxford English Dictionary, Def. "graphical user interface", 2003.*

(Continued)

*Primary Examiner* — Barbara Joan Amelunxen
(74) *Attorney, Agent, or Firm* — Tutunjian & Bitetto, P.C.; Louis Percello

(57) ABSTRACT

A system and method are provided for direct manipulation of a triangular distribution of information using a graphical user interface. The system includes a graphical user interface for receiving user inputted values. The system further includes a data calculator for generating estimates based on the user inputted values, and for generating curves for display on a grid based on at least one of, the user inputted values and the estimates. The graphical user interface respectively receives the user inputted values based at least on a current position of a pointer on the grid. The graphical user interface is capable of applying a direct manipulation, based at least on the current position of the pointer on the grid, to at least one of the user inputted values and the estimates, such that a result of the direct manipulation is displayed on the grid.

21 Claims, 8 Drawing Sheets

(56) References Cited

U.S. PATENT DOCUMENTS

| | | | |
|---|---|---|---|
| 5,596,703 A * | 1/1997 | Eick et al. | 715/700 |
| 5,828,793 A * | 10/1998 | Mann | 382/284 |
| 5,835,085 A * | 11/1998 | Eick et al. | 715/853 |
| 5,844,572 A * | 12/1998 | Schott | 345/440 |
| 6,125,355 A * | 9/2000 | Bekaert et al. | 705/36 R |
| 6,895,382 B1 * | 5/2005 | Srinivasan et al. | 705/7.17 |
| 7,249,327 B2 * | 7/2007 | Nelson et al. | 715/782 |
| 7,321,871 B2 * | 1/2008 | Scott et al. | 705/36 R |
| 7,330,767 B2 * | 2/2008 | Thiele et al. | 700/29 |
| 7,548,883 B2 * | 6/2009 | Lawrence | 705/38 |
| 7,610,563 B2 * | 10/2009 | Nelson et al. | 715/839 |
| 7,636,680 B2 * | 12/2009 | Gatto | 705/36 R |
| 7,702,574 B2 * | 4/2010 | Lawrence | 705/38 |
| 7,752,112 B2 * | 7/2010 | Gatto et al. | 705/36 R |
| 2002/0010667 A1 * | 1/2002 | Kant et al. | 705/35 |
| 2002/0174049 A1 * | 11/2002 | Kitahara | 705/36 |
| 2003/0065668 A1 * | 4/2003 | Sowizral et al. | 707/100 |
| 2003/0158800 A1 * | 8/2003 | Pisello et al. | 705/35 |
| 2003/0167146 A1 * | 9/2003 | Tezuka et al. | 702/129 |
| 2003/0179237 A1 * | 9/2003 | Nelson et al. | 345/765 |
| 2004/0039585 A1 * | 2/2004 | Kitamura et al. | 705/1 |
| 2004/0073505 A1 * | 4/2004 | Wright | 705/36 |
| 2004/0138932 A1 * | 7/2004 | Johnson et al. | 705/7 |
| 2004/0143717 A1 * | 7/2004 | Cantrill | 711/173 |
| 2005/0122325 A1 * | 6/2005 | Twait | 345/440 |
| 2005/0125328 A1 * | 6/2005 | Schluetter | 705/37 |
| 2006/0167781 A1 * | 7/2006 | Kemp et al. | 705/35 |
| 2006/0212382 A1 * | 9/2006 | Anderson et al. | 705/37 |
| 2006/0229970 A1 * | 10/2006 | Anderson et al. | 705/37 |
| 2006/0259384 A1 * | 11/2006 | Schluetter et al. | 705/35 |
| 2006/0265304 A1 * | 11/2006 | Brumfield et al. | 705/35 |
| 2006/0277136 A1 * | 12/2006 | O'Connor et al. | 705/37 |
| 2007/0033123 A1 * | 2/2007 | Navin | 705/35 |
| 2007/0179875 A1 * | 8/2007 | Chiu | 705/35 |
| 2007/0226661 A1 * | 9/2007 | Olhofer et al. | 716/2 |
| 2008/0114630 A1 * | 5/2008 | Chang et al. | 705/7 |
| 2008/0126989 A1 * | 5/2008 | Flores et al. | 715/833 |
| 2008/0143746 A1 * | 6/2008 | Irons | 345/629 |
| 2008/0177593 A1 * | 7/2008 | Clayton et al. | 705/7 |
| 2008/0270886 A1 * | 10/2008 | Gossweiler et al. | 715/227 |
| 2008/0288889 A1 * | 11/2008 | Hunt et al. | 715/810 |
| 2009/0043643 A1 * | 2/2009 | Kitamura et al. | 705/10 |
| 2009/0076974 A1 * | 3/2009 | Berg et al. | 705/36 R |
| 2009/0259599 A1 * | 10/2009 | Wallman | 705/36 R |

OTHER PUBLICATIONS

Fionnuala M. Gornley et al. The Utility of cash flow forecasts in the management of corporate cash balances. European Journal of Operational Research vol. 182, 2:923-35, Science Direct, Elsevier, (Oct. 16, 2007).*

* cited by examiner

SYSTEM AND METHOD FOR DIRECT MANIPULATION OF A TRIANGULAR DISTRIBUTION OF INFORMATION USING A GRAPHICAL USER INTERFACE

BACKGROUND

1. Technical Field

The present invention relates to the manipulation of financial information and, more particularly, to a system and method for direct manipulation of a triangular distribution of information using a graphical user interface.

2. Description of the Related Art

Estimating financial data such as the cost of a project or the expected revenue of that project, even when well informed, is a difficult process with a high degree of error. A method of capturing triangular distributions around such estimates allows for the specification of not only one estimate for a given data point, but an upper and lower bound on that estimate. This allows for a specification of the uncertainty of the given estimate. Unfortunately, this involves entering three separate estimates for any given data point.

Typically these data points are input into a spreadsheet or database to be used in various calculations or simulations. Entering these numbers by hand is tedious and error-prone. For most simulations, a continuous set of data is desired, for example, for every quarter over a given time period (e.g., a five year period). In this example, three estimates for each quarter over a five year period would require entering sixty values by hand. Those sixty values only correspond to one variable. Moreover, adjusting these estimates, once entered, can be a very cumbersome task.

SUMMARY

The shortcomings of the prior art are overcome and additional advantages are provided through the provision of a system and method for direct manipulation of a triangular distribution of information using a graphical user interface.

According to an aspect of the present principles, there is provided a system. The system includes a graphical user interface for receiving one or more user inputted values. The system further includes a data calculator for generating one or more estimates based on the one or more user inputted values, and for generating one or more curves for display on a grid based on at least one of, at least one of the one or more user inputted values and at least one of the one or more estimates. The graphical user interface respectively receives the one or more user inputted values based at least on a current position of a pointer on the grid. The graphical user interface is capable of applying a direct manipulation, based at least on the current position of the pointer on the grid, to at least one of, at least one of the one or more user inputted values and at least one of the one or more estimates, such that a result of the direct manipulation is displayed on the grid.

According to another aspect of the present principles, there is provided a method. The method includes respectively receiving one or more user inputted values based on a current position of a pointer on a grid. The pointer corresponds to a graphical user interface. The method further includes generating one or more estimates based on the one or more user inputted values. The method also includes creating one or more curves for display on a grid based on at least one of, at least one of the one or more user inputted values and at least one of the one or more estimates. The method additionally includes applying a direct manipulation, based at least on the current position of the pointer on the grid, to at least one of, at least one of the one or more user inputted values and at least one of the one or more estimates, such that a result of the direct manipulation is displayed on the grid.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
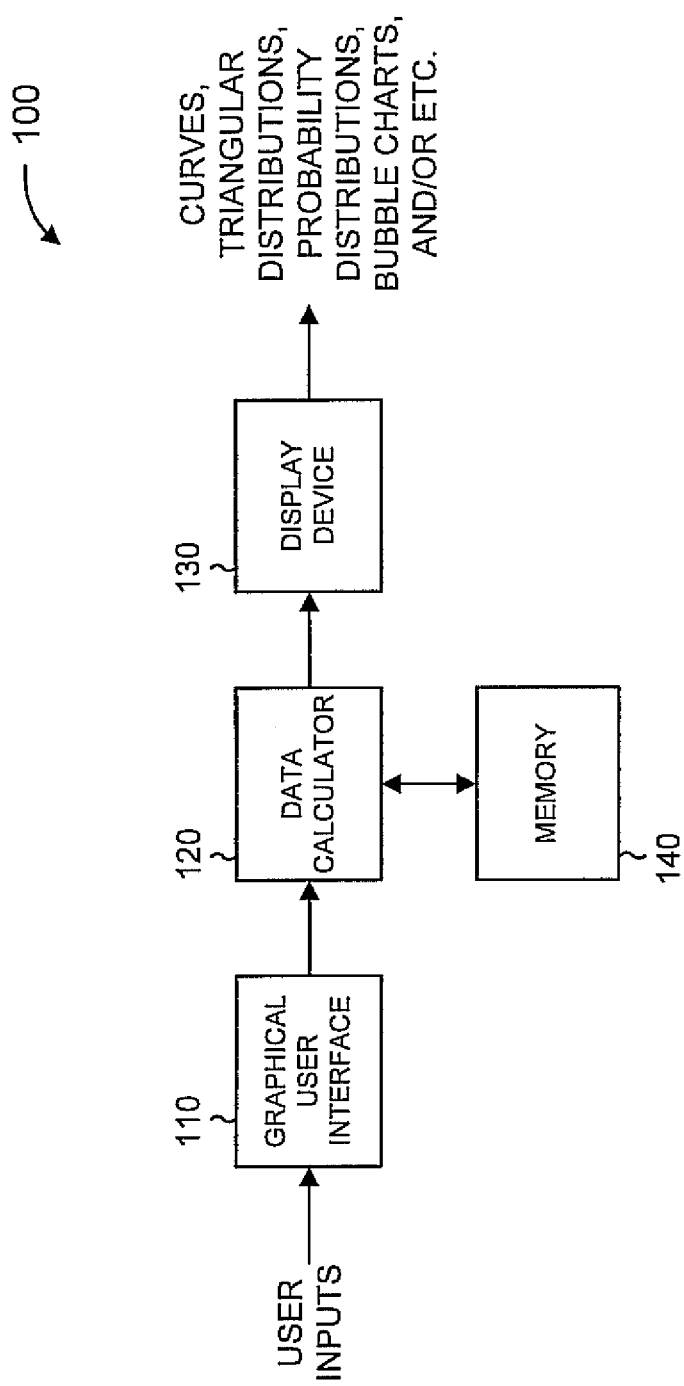
FIG. 1 is a block diagram showing an exemplary system 100 for direct manipulation of triangular distributions of information using a graphical user interface, in accordance with an embodiment of the present principles.

Referring now in detail to the FIGURES in which like numerals represent the same or similar elements and initially to FIG. 1, an exemplary system 100 in accordance with an embodiment of the present principles is shown for direct manipulation of triangular distributions of information using a graphical user interface.

In an embodiment, the system 100 includes a graphical user interface (GUI) 110, a data calculator 120, a memory 130, and a display device 140. The graphical user interface 110 is configured to receive inputs from a user for inputting into the system 100, as described in further detail herein below. The data calculator 120 is operatively coupled to the graphical user interface 110, and is configured to perform data calculations with respect to at least the user inputs received using the graphical user interface 110. In an embodiment, such calculations involve generating estimates of one or more values based on the user inputs. Moreover, the data calculator 120 is capable of generating one or more curves based on the user inputs and/or the estimates, as well as generating data for probability distributions and bubble charts as described herein. The memory 130 may be used to store one or more of the user inputs, the estimates, curve data, and pixel data representing any of the preceding. The display device 140 may be used to display one or more of the user inputs, the estimates, and curve data. The display device 140 may display the preceding based on, for example, the pixel data. Thus, for example, the memory 130 may be used to store curve data for later use in displaying the same, for storage on another storage medium (e.g., compact disks, etc.), for transport, and so forth. It is to be appreciated that data calculator 120 may include its own memory, or may work in conjunction with memory 130 to implement the present principles. For example, programming code may be stored in a memory that is part of data calculator 120 and/or may be stored in memory 130, with such programming code directed to implementing the present principles.

Figure 2:
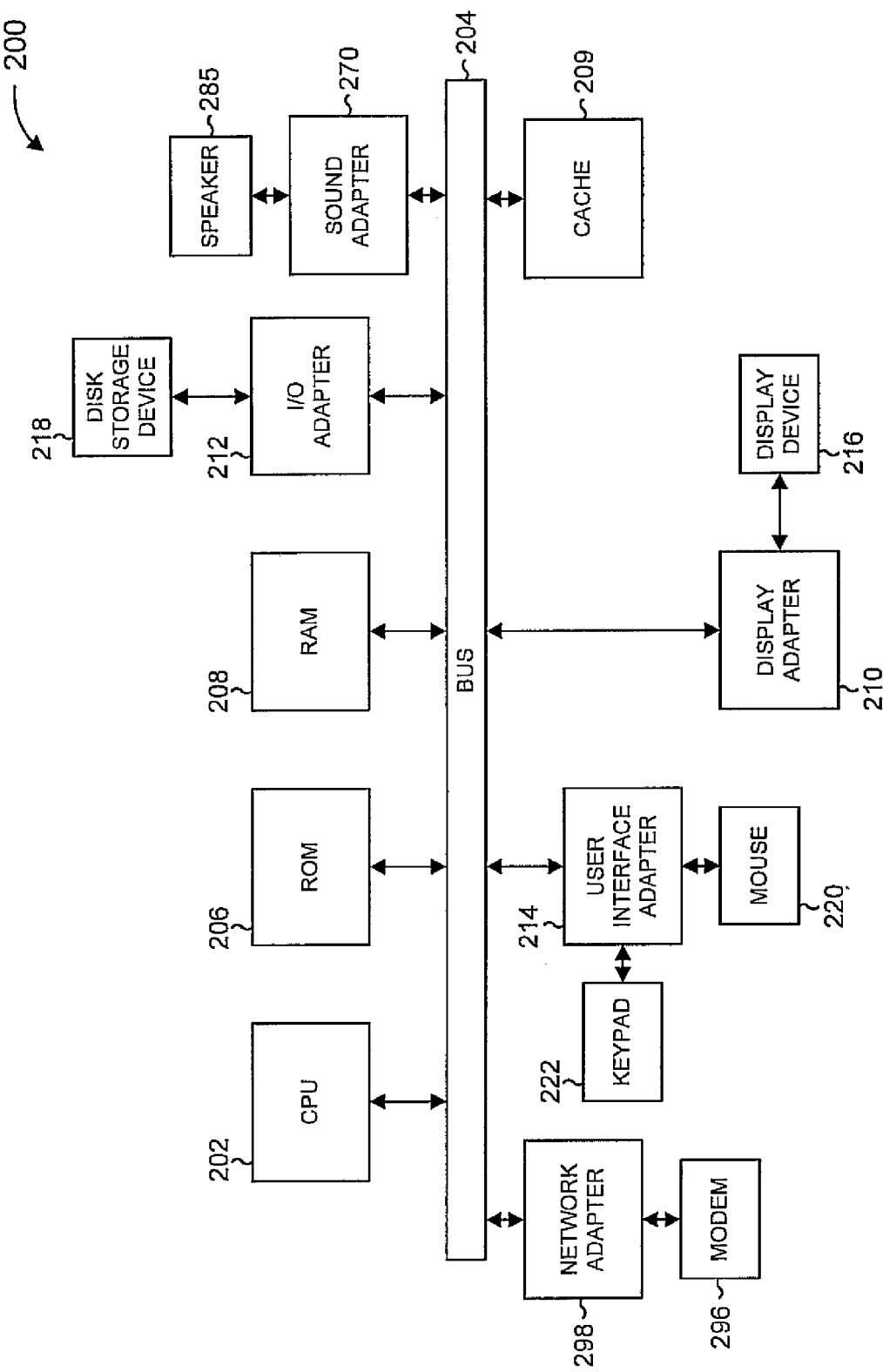
FIG. 2 is a block diagram showing an exemplary computer system 200 capable of implementing direct manipulation of triangular distributions of information using a graphical user interface, in accordance with an embodiment of the present principles.

Referring now to FIG. 2, an exemplary computer system 200 is shown capable of implementing direct manipulation of triangular distributions of information using a graphical user interface in accordance with an embodiment of the present principles.

The computer system 200 includes at least one processor (CPU) 202 operatively coupled to other components via a system bus 204. A read only memory (ROM) 206, a random access memory (RAM) 208, a display adapter 210, an I/O adapter 212, a user interface adapter 214, a sound adapter 270, and a network adapter 298, are operatively coupled to the system bus 204.

A display device 216 is operatively coupled to system bus 104 by display adapter 210. A disk storage device (e.g., a magnetic or optical disk storage device) 218 is operatively coupled to system bus 204 by I/O adapter 212.

A mouse 220 and keyboard 222 are operatively coupled to system bus 204 by user interface adapter 214. The mouse 220 and keyboard 222 are used to input and output information to and from system 200.

At least one speaker (herein after "speaker") 285 is operatively coupled to system bus 204 by sound adapter 299.

A (digital and/or analog) modem 296 is operatively coupled to system bus 204 by network adapter 298.

It is to be appreciated that, for example, at least display 216, keypad 222 and/or mouse 220 may correspond to graphical user interface 110 shown in FIG. 1. Moreover, at least CPU 202, and a memory including, but not limited to, ROM 206, RAM 208, and/or disk storage device 218 may corresponding to data calculator 120 shown in FIG. 1. Further, at least a memory such as, for example, ROM 206, RAM 208, and/or disk storage device 218 may correspond to memory 130 shown in FIG. 1. Of course, display device 216 may correspond to display device 140 shown in FIG. 1. In this way, a general purpose computer may be used to implement the present principles. In such a case, many components of a general purpose computer may not be necessary to implement the present principles and, thus, may be omitted, including, but not limited to, sound adapter 270 and speaker 285, as well as network adapter 298 and modem 296. Of course, such elements may still be configured to operate in accordance with the present principles. For example, sound adapter 270 and speaker 285 may be configured to provide an audible verification of the receipt (input) of data values, the modification of data values, and so forth. Further, the network adapter 298 and the modem 296 may be used, for example, to either receive user inputs in the case that the graphical user interface is implemented remotely with respect to the display device 216 included in system 200. Additionally, network adapter 298 and modem 296 may be used to transport data generated in accordance with the present principles (e.g., estimates, curves, and so forth) to a remote display device. Given the teachings of the present principles provided herein, these and other variations and configurations of the elements capable of implementing the present principles are readily contemplated by one of ordinary skill in this and related arts, while maintaining the spirit of the present principles.

Figure 3:
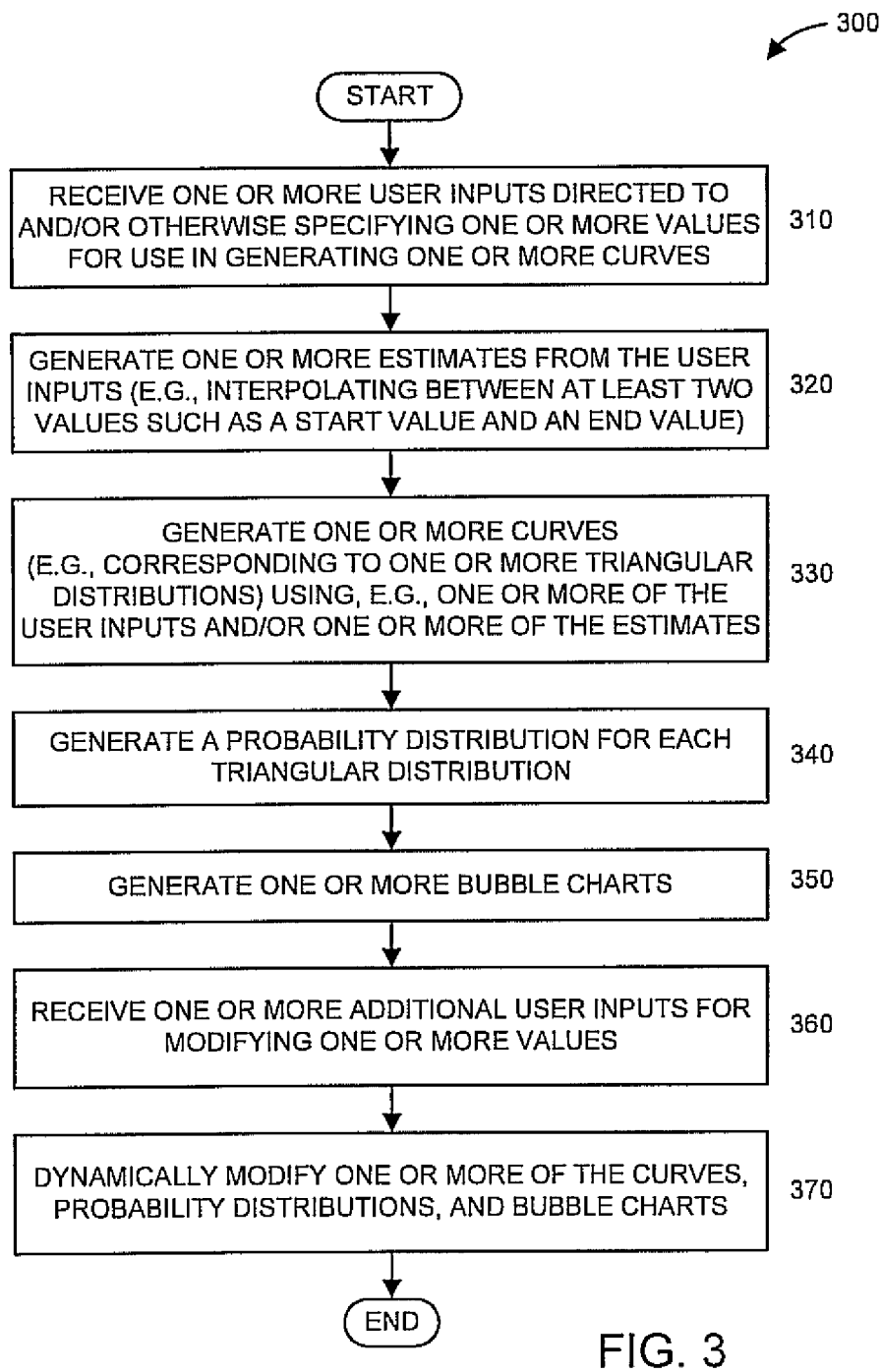
FIG. 3 is a flow diagram showing an exemplary method 300 for direct manipulation of a triangular distribution of financial information using a graphical user interface, in accordance with an embodiment of the present principles.

Referring now to FIG. 3, an exemplary method 300 is shown for direct manipulation of a triangular distribution of financial information using a graphical user interface, in accordance with an embodiment of the present principles.

It is to be appreciated that one or more of the following steps of method 300 may also include the displaying of any data generated thereby, where such data may include, but is not limited to, specific values (also referred to herein as "data points"), variable names, curves (including triangular distribution curves), probability distributions, and bubble charts.

The method 300 includes receiving one or more user inputs directed to and/or otherwise specifying one or more values for use in generating one or more curves (step 310). Such values may be specific known values and/or estimates. For example, time constraints are likely to be specific know values, while costs, particularly over a given time period, are likely to be estimates, unless they are fixed constraints (which would likely to apply to upper bound values in such a case). In an embodiment, such curves may correspond to triangular distributions. The user inputs are received, for example, using the graphical user interface 110.

The user inputs may relate, but are not limited to, financial information. Moreover, the user inputs may relate, but are not limited to, triangular distributions. In the case of curve generation, two user input values, corresponding to a start value and an end value are provided by a user. The start value and the end value provided by the user may correspond to the start value and the end value of a particular curve. However, it is to be appreciated that in some cases, a user may only provide a single input value such as, for example, when a second value not specified by the user is considered to be a default value. For example, certain types of curves may have a default start value, default end value, and so forth.

The triangular distributions have an expected (or middle) value, a lower bound (e.g., a worst case value), and an upper bound (e.g., a best case value). In an embodiment, a triangular distribution(s) may relate, but are not limited to, at least one of revenue, development cost, and maintenance cost. In an embodiment, a first user input may specify a particular variable (e.g., by variable name, etc.) to be modified (in the case of existing, and hence, defined data) or to be defined (in the case of previously undefined data), and a second user input may specify a value for that particular variable. Moreover, additional user inputs may specify a lower bound and an upper bound for the (middle) value entered, for example, as the second user input.

At step 320, one or more estimates are generated from the user inputs. For example, in the case that the user inputs provided at step 310 specified a start value and an end value corresponding to a curve to be generated, interpolation may be used at step 320 to generate one or more estimates for filling in the values in between the start value and the end value provided by the user. Moreover, in the case that the user specified not only the start value and end value for a particular curve to be generated, but also a lower bound and an upper bound for both the start value and the end value, one or more estimates may also be generated for filling in the values for the corresponding curves corresponding the lower bounds and upper bounds of the data points of the primary (or middle)

curve. The estimates generated by step 320 may be so generated by, for example, data calculator 120.

At step 330, one or more curves are generated using, for example, one or more of the user input values provided at step 310 and/or the estimates generated at step 320. Such curves may correspond to one or more triangular distributions. For example, in the case of triangular distributions, three separate curves are generated for each distribution. Each curve may have a horizontal axis corresponding to time (for example, in quarters, or some other time unit), and a vertical axis corresponding to money (for example, dollars, or some other unit of money). A grid showing exemplary triangular distributions to which the present principles may be applied is described herein below with respect to FIG. 6.

Alternatively (in the case that the curves generated at step 330 may not be displayed), or in addition to step 330, at step 340, a probability distribution is generated for each triangular distribution. In an embodiment, the probability distribution may represent, but is not limited to, the net present value (NPV). A grid showing an exemplary probability distribution in accordance with an embodiment of the present principles is described herein below with respect to FIG. 7.

Alternatively, or in addition to step 330 and/or step 340, at step 350, one or more bubble chart(s) are generated based on the user input values provided at step 310, the estimates generated at step 320, the curves generated at step 330, and/or the probability distribution generated at step 340. In an embodiment, a bubble chart may be generated for each graph (i.e., each triangular distribution which includes three curves). An exemplary bubble chart in accordance with an embodiment of the present principles is described herein below with respect to FIG. 8.

At step 360, one or more additional user inputs are received, for modifying one or more existing values either previously provided by the user and/or estimated at any of the preceding steps (including but not limited to step 320).

At step 370, based on the additional user inputs provided at step 360, one or more of the curves (and, hence, any corresponding triangular distribution associated therewith), probability distributions, and bubble charts are dynamically modified for at least one of storage (for example, for subsequent display) and/or essentially contemporaneous display.

It should be understood that the elements shown in the FIGURES may be implemented in various forms of hardware, software or combinations thereof. Preferably, these elements are implemented in software on one or more appropriately programmed general-purpose digital computers having a processor and memory and input/output interfaces.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

While the present principles are primarily described herein with respect to financial applications in general, and to revenue, development cost, and maintenance cost, in further exemplary embodiments, it is to be appreciated that the present principles are not limited to solely financial applications, let alone the specific examples thereof described herein and, thus, may be applied to other applications, as readily contemplated by one of ordinary skill in this and related arts, given the teachings of the present principles provided herein, while maintaining the spirit of the present principles. For example, other types of financial distributions (e.g., other than revenue, development cost, and maintenance cost) as well as non-financial distributions, may be used in accordance with the present principles. Such non-financial distributions include, but are not limited to, any instance where value can be represented in relative terms such that one expression of value can be compared with another expression of value and judged to be of greater, lesser or equal value. This may include such terms as quality of life, yield from crops, productivity, customer satisfaction, and so forth.

Moreover, it is to be appreciated that while the present principles are primarily described herein with respect to triangular distributions in general, of course, the present principles are not limited to solely triangular distributions and, thus, may be readily applied to other types of distributions, as readily understood by one of ordinary skill in this and related arts, given the teachings of the present principles provided herein, while maintaining the spirit of the present principles.

Figure 4:
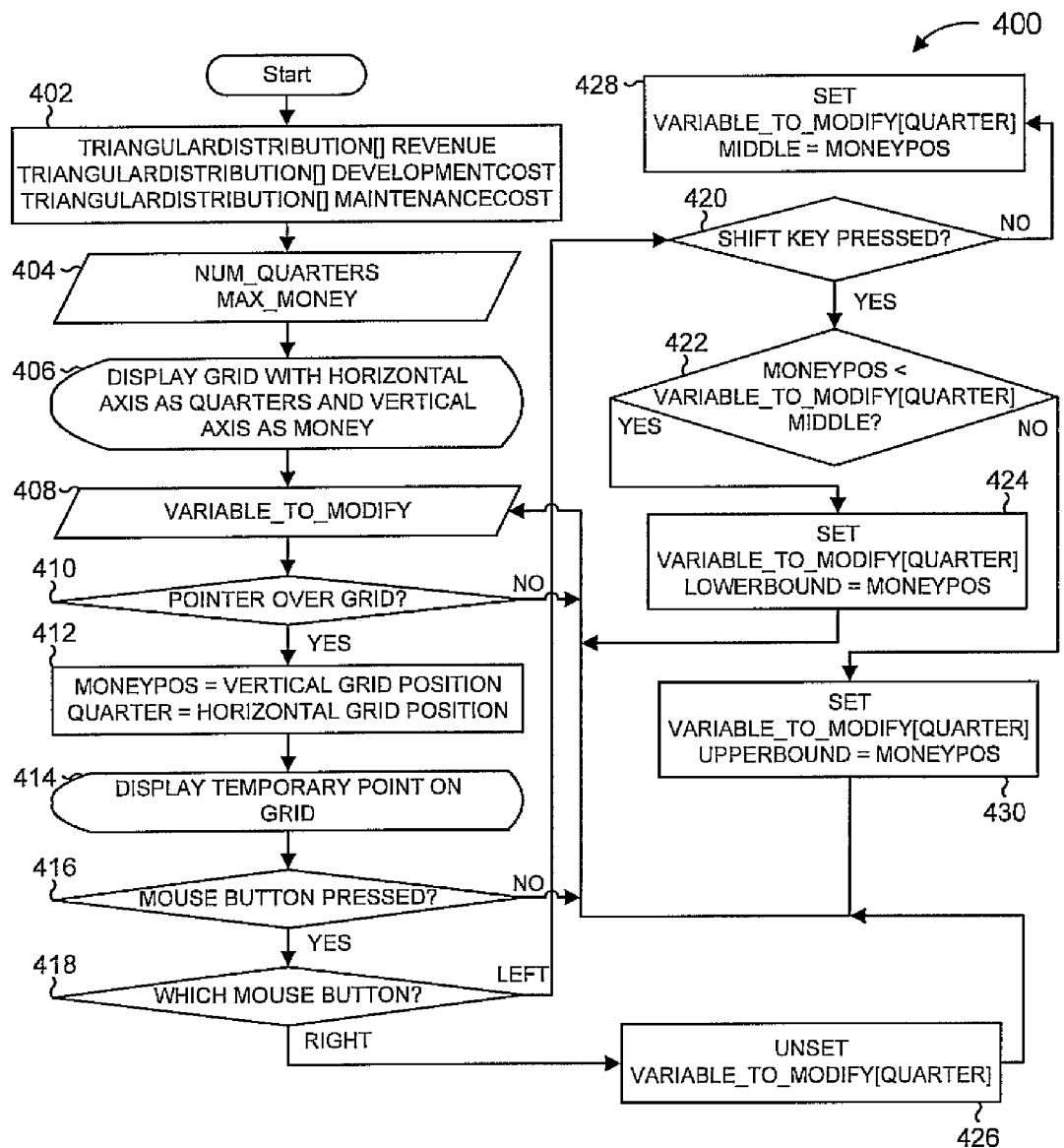
FIG. 4 is a flow diagram illustrating another exemplary method 400 for directly manipulating a triangular distribution of financial information using a graphical user interface, in accordance with an embodiment of the present principles.

With respect to user inputs, the following is provided for a general explanation thereof, following by a particular example set forth with respect to FIG. 4. Initially, a two dimensional grid may be presented to the user. The horizontal axis represents time, such as, but not limited to, a financial time frame in quarters starting with zero quarter and extending to the desired duration. The vertical axis represents the amount of money considered, starting from zero and extending vertically to the desired maximum.

To input financial data, the user first selects which variable is to be entered, choosing from one of the following selections: revenue, development cost, or maintenance cost.

Then the user moves the mouse over the grid to the quarter and money amount desired. The user presses the left mouse button to place a point on the grid and enter a value into the array of values for the selected variable. If a value currently exists for that variable for the selected quarter, then the existing value is replaced with the new value. If the user keeps the left mouse button pressed while moving the mouse, the vertical movement of the mouse will shift the money amount entered to match the vertical position of the mouse on the grid. The user continues to input additional financial values in the same manner. The user may freely change between entering any of the three variables.

As additional values are input, a smooth curve is drawn between the points input for a given variable. If there is a gap between the points entered by the user, then the smooth curve is used to interpolate the intervening points.

Once a point has been input of a given quarter, the user may enter an upper or lower bound for that point by moving the mouse to a point above or below that point and pressing the shift key while simultaneously pressing the left mouse button. If the user keeps both the shift key and the left mouse button pressed while simultaneously moving the mouse vertically, the corresponding upper or lower bound will shift to match the vertical position of the mouse.

With respect to curve generation, three smooth curves are drawn between the points entered for a given variable, one each for the upper, middle, and lower values. The curves may be determined in any of a number of ways such as, but not limited to, using a spline(s). In an embodiment, a series of connected Bezier curves are used to join pairs of points.

With respect to value interpolation, if there is a gap between the points entered for a given variable, the flow of the curve between the actual points entered is used to determine the intervening values. In the case of a Bezier curve, the curve is followed between points entered by the user. Whenever the curve crosses a quarter for which no value has been entered, the intersection point of the curve and the quarter on the grid determine the value for that point.

Of course, the present principles are not limited solely to the specific details of the value selection/modification process and curve generation process described herein, and variations and other implementations thereof may be readily contemplated and implemented by one of ordinary skill in this and related arts, given the teachings of the present principles provided herein, while maintaining the spirit of the present principles.

FIG. 4 is a flow diagram illustrating another method 400 for directly manipulating a triangular distribution of financial information using a graphical user interface, in accordance with an embodiment of the present principles.

At step 402, triangular distributions are selected for direct manipulation, where such triangular distributions include and/or are otherwise directed to revenue, development cost, and maintenance cost.

At step 404, two or more inputs relating to the number of quarters (num_quarters) and a maximum bound on money (max_money) are received, for use in respectively setting a maximum value for a horizontal axis and a maximum value for a vertical axis of a graph (also interchangeably referred to herein as "grid") to be generated and/or modified.

At step 406, a grid is displayed having a horizontal axis representing quarters and a maximum value of the horizontal axis corresponding to the value of num_quarters provided at step 404, and having a vertical axis representing money and a maximum value of the vertical axis corresponding to the value of max_money provided at step 404.

At step 408, a user input (variable_to_modify) is received directed to modifying a particular variable shown in the grid.

At step 410, it is determined whether the mouse pointer (hereinafter pointer) is currently over the grid.

If so, then the method 400 continues to step 412. Otherwise, the method 400 returns to step 408.

At step 412, a temporary point, dependent upon the current position of the pointer is identified, where the current vertical grid position of the pointer represents a particular money value (moneypos), and the current horizontal grid position of the pointer represents a particular quarter (quarter).

At step 414, the temporary point is displayed on the grid.

At step 416, it is determined whether the mouse button is pressed.

If so, then the method 400 proceeds to step 418. Otherwise, the method 400 returns to step 408.

At step 418, it is determined which mouse button is pressed. If the left mouse button is pressed, the method 300 proceeds to step 420. Otherwise, if the right mouse button is pressed, the method proceeds to step 426.

At step 420, it is determined whether the shift key is pressed. If so, then the method 400 proceeds to step 422. Otherwise, the method 400 proceeds to step 428.

At step 422, it is determined whether moneypos is less than variable_to_modify[quarter], with respect to the middle (e.g., expected) value thereof.

If so, then the method 400 proceeds to step 424. Otherwise, the method 400 proceeds to step 430.

At step 424, a data point for the lower (worst case value) curve in a triangular distribution is set, where a location of the data point on the curve (indicating exactly which data point) is set based on a current horizontal grid position of the pointer and a value for that data point is set based on a current vertical grid position of the pointer, and the method 400 returns to step 408.

At step 426, a particular value of a data point on a curve in a triangular distribution is unset, where the particular value that is to be unset is determined based on a current horizontal grip position of the pointer, and the method returns to step 408.

At step 428, a data point for the middle (expected value) curve in a triangular distribution is set, where a location of the data point on the curve (indicating exactly which data point) is set based on a current horizontal grid position of the pointer and a value for that data point is set based on a current vertical grid position of the pointer, and the method 400 returns to step 408.

At step 430, a data point for the upper (best case value) curve in a triangular distribution is set, where a location of the data point on the curve (indicating exactly which data point) is set based on a current horizontal grid position of the pointer and a value for that data point is set based on a current vertical grid position of the pointer, and the method 400 returns to step 408.

Figure 5:
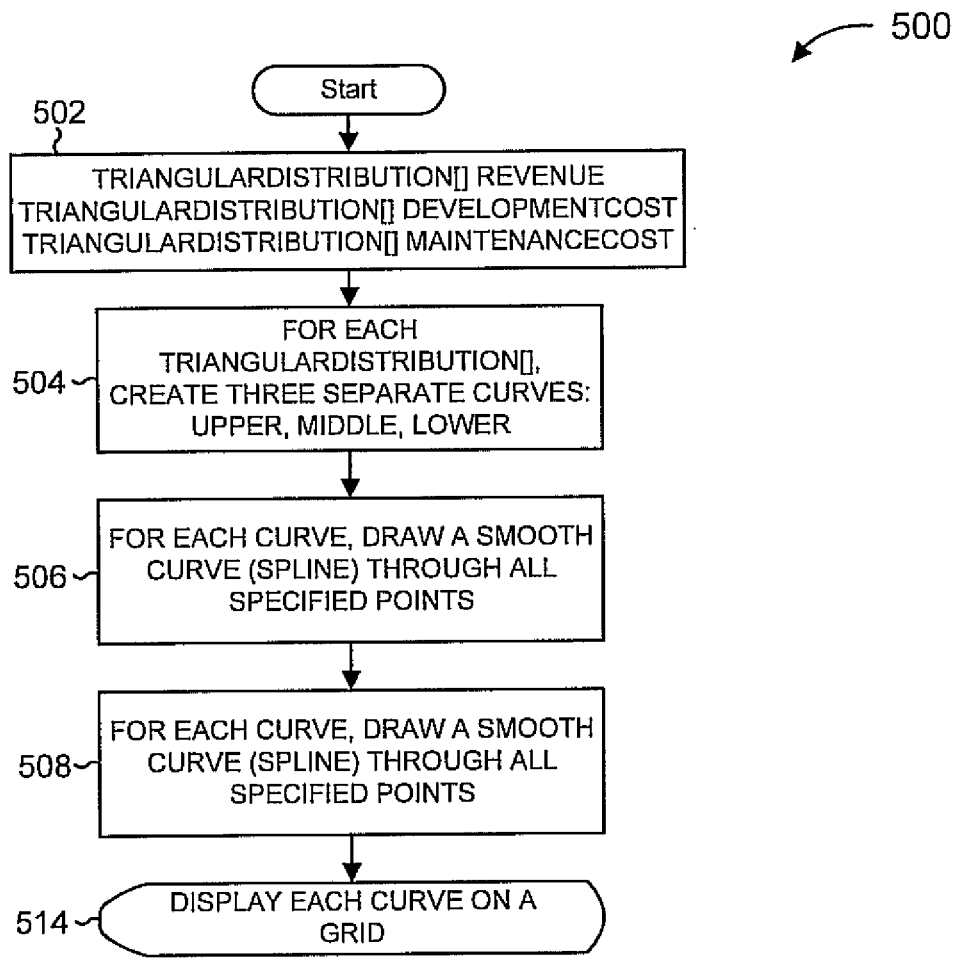
FIG. 5 is a flow diagram illustrating an exemplary method 500 for displaying triangular distributions of financial information generated in accordance with the present principles.

FIG. 5 is a flow diagram illustrating an exemplary method 500 for displaying triangular distributions of financial information generated in accordance with the present principles.

At step 505, triangular distributions are selected for processing, where such triangular distributions include and/or are otherwise directed to revenue, development cost, and maintenance cost.

At step 510, for each triangular distribution[ ] three separate curves are created, namely an upper curve, a middle curve, and a lower curve, which may respectively correspond to best case values, expected values, and word case values.

At step 515, for each curve, a smooth curve (spline) is drawn through all specified data points.

At step 520, for each curve, replace missing quarterly data with interpolated data from the smooth curve.

At step 525, each curve is displayed on a grid.

Figure 6:
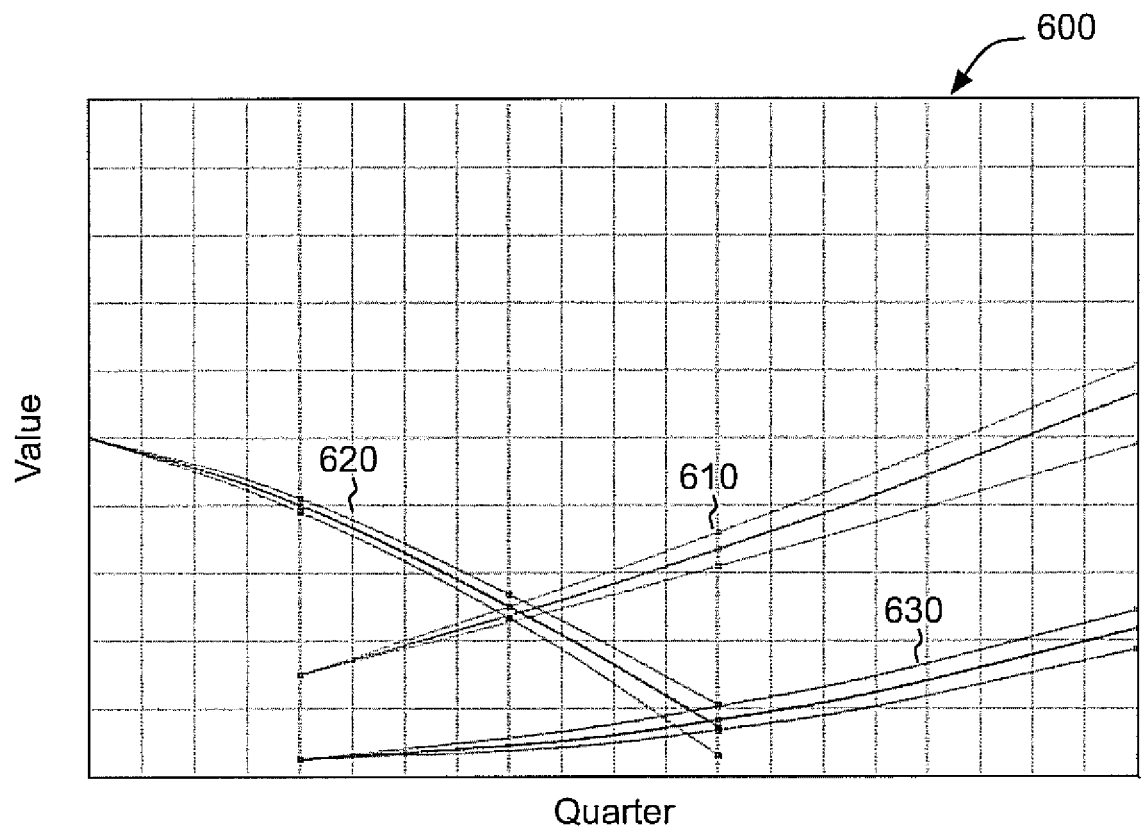
FIG. 6 is a diagram illustrating an exemplary grid 600 having three triangular distributions thereon, to which the present principles may be applied, in accordance with an embodiment of the present principles.

FIG. 6 is a diagram illustrating an exemplary grid 600 having three triangular distributions thereon, to which the present principles may be applied, in accordance with an embodiment of the present principles.

The horizontal axis of the grid 600 represents time, and the vertical axis represents money. The triangular distributions are configured to allow a user to navigate over the triangular distributions, for example, using a mouse in order to see a specific value corresponding to the particular current location at which the mouse pointer is located, and/or to readily insert a new value and/or modify an existing value.

The three triangular distributions respectively correspond to cost benefit 610, development cost 620, and maintenance cost 630, for a project under evaluation. As described above, one or more values of any of the curves in any of the triangular distributions may be readily modified using a graphical user interface, in accordance with the present principles. It is to be appreciated that any units of time and money may be used in accordance with the teachings of the present principles.

Figure 7:
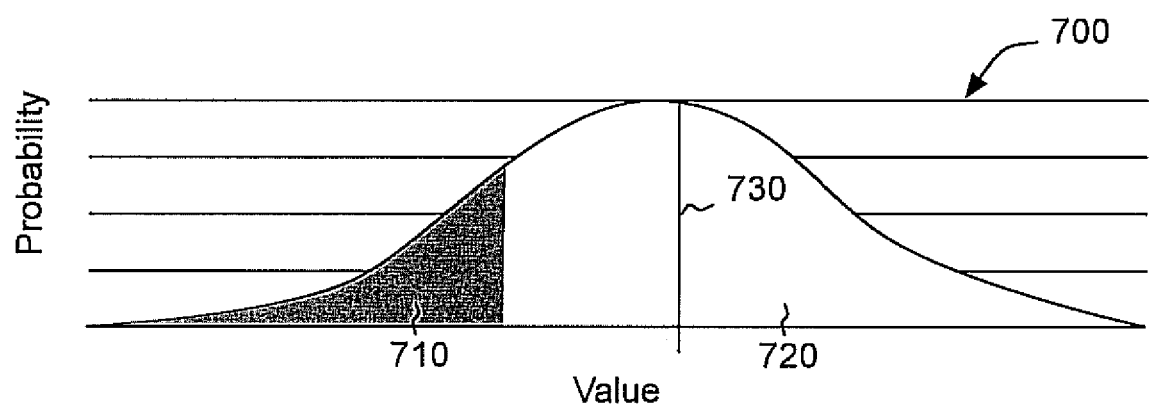
FIG. 7 is a diagram illustrating an exemplary probability distribution corresponding to a net present value for a project under evaluation, in accordance with an embodiment of the present principles.

FIG. 7 is a diagram illustrating an exemplary probability distribution 700 corresponding to a net present value (NPV) for a project under evaluation, in accordance with an embodiment of the present principles.

Different colors, shadings, or other indicators may be used to "flag" (highlight) the values in the probability distribution 700 that indicate that a particular project represented by the probability distribution 700 will lose money 710 or make money 720. A vertical line 730 dissecting the probability distribution 700 represents an expected value. The probability distribution 700 is configured to allow a user to navigate over the probability distribution 700, for example, using a mouse in order to see a specific value corresponding to the particular current location at which the mouse pointer is located.

Figure 8:
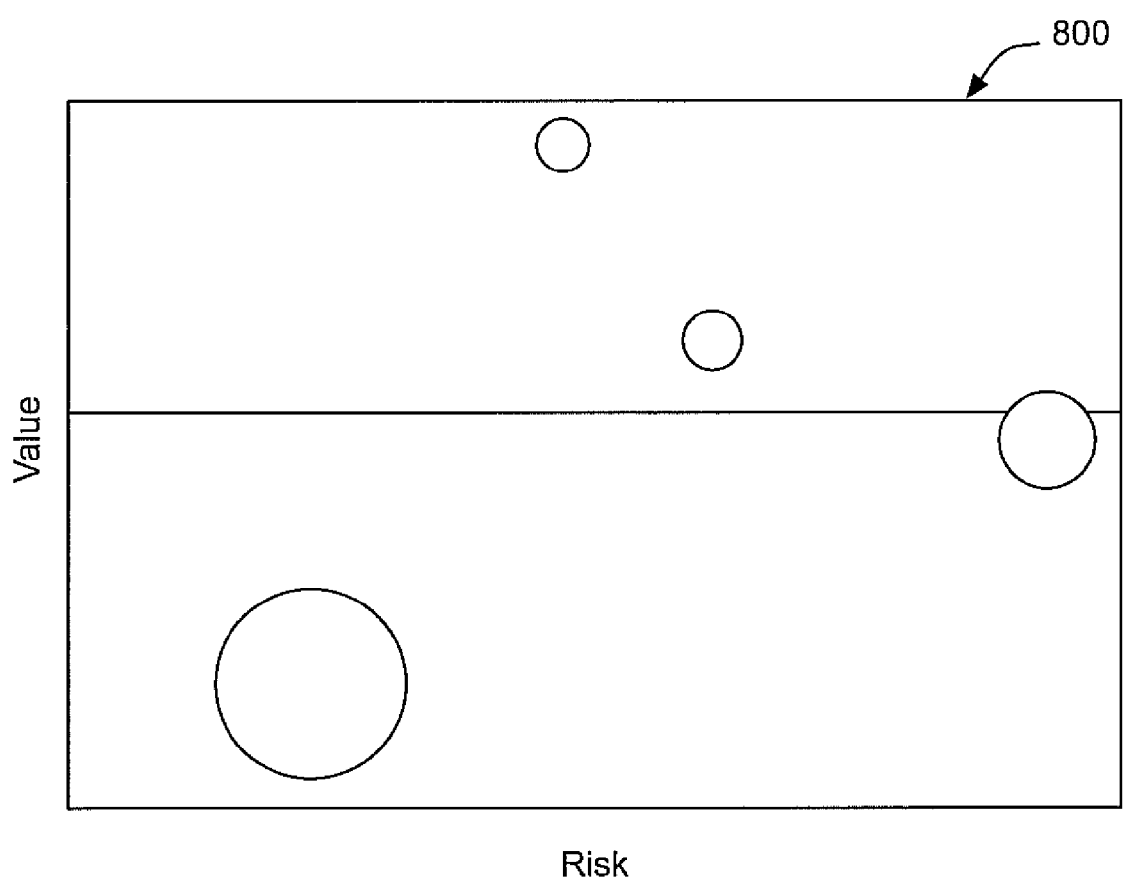
FIG. 8 is a diagram illustrating an exemplary bubble chart for multiple projects under evaluation, in accordance with an embodiment of the present principles.

FIG. 8 is a diagram illustrating an exemplary bubble chart 800 for multiple projects under evaluation, in accordance with an embodiment of the present principles.

In the bubble chart 800, the horizontal axis represents expected risk, and the vertical axis represents expected value. Moreover, the size of each respective bubble indicates the relative cost of a corresponding one of the multiple projects and, thus, provides a quick way of determining which projects having a higher or lower cost relative to the other projects in the bubble chart 800. For example, a large bubble in the bubble chart 800 indicates a larger cost relative to a smaller bubble in the bubble chart 800. The bubble chart 800 is configured to allow a user to navigate over the bubble chart 800, for example, using a mouse in order to see a specific value corresponding to the particular current location at which the mouse pointer is located. In the embodiment of a bubble chart as shown in FIG. 8, values occurring above the horizontal line that segments the chart are positive values, while values occurring below that horizontal line are negative values. Of course, other arrangements are possible and within the scope of the present principles.

Hence, in accordance with the present principles, a system and method for direct manipulation of distributions (e.g., but not limited to, triangular distributions) of information (e.g., but not limited to, financial information) using a graphical user interface. Using the present invention, data/estimates can be rapidly entered and then easily manipulated once entered. If a continuum of data is desired, then interpolation between entered points via, for example, a spline curve, can be used to fill in missing gaps. Thus, by entering a few data points directly on the graph, a complete set of estimates can be input.

Entering the upper and lower estimates can be done easily using the same techniques, by directly manipulating the curves on the graph.

Multiple variables can be input on the same graphical user interface using the above described techniques by fixing (modifying to a current desired value) the previously entered data and allowing direct manipulation of the estimates of one variable at a time or as a group (the latter, for example, occurring when a data point such as an end point is manipulated).

These and other features and advantages of the present principles are readily apparent to one of ordinary skill in this and related arts, given the teachings of the present principles provided herein.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A system, comprising:

a graphical user interface for receiving user inputted values, the graphical user interface having at least a display device with a grid and a pointer depicted thereon, the grid having a time axis and a value axis, the value axis representing a plurality of user selectable candidate values, said values being a subset of the user inputted values, based on a current position of the pointer on the grid, the pointer being positionable by the user via the graphical user interface; and a data calculator for generating estimates based on the user inputted values, and for generating three curves for display on the grid based on at least one of, the user inputted values and the estimates, wherein the three curves comprise a first, a second, and a third curve representing a triangular distribution and respectively corresponding to expected values for a given item under evaluation, upper bounds with respect to the expected values, and lower bounds with respect to the expected values;

wherein said graphical user interface is capable of applying a direct manipulation, based at least on the current position of the pointer on the grid, to at least one of the user inputted values and the estimates, such that a result of the direct manipulation is displayed on the grid, and wherein said graphical user interface enables a user to enter triplets corresponding to an expected value, an upper bound for the expected value, and a lower bound for the expected value, based at least on the current position of the pointer on the grid.

2. The system of claim 1, wherein the graphical user interface is further configured to modify at least one of the one or more curves based on the direct manipulation.

3. The system of claim 1, wherein the triangular distribution comprises three triangular distributions respectively corresponding to revenue, development cost, and maintenance cost for a given project under evaluation, and the first curve, the second curve, and the third curve are respectively generated for each one of the three triangular distributions.

4. The system of claim 1, wherein said data calculator uses interpolation to generate the estimates to fill in smooth curve values in between another value and at least one of the user inputted values based on a flow between the other value and the at least one user inputted value.

5. The system of claim 4, wherein the other value is another one of the user inputted values.

6. The system of claim 1, wherein said data calculator is further for generating one or more probability distributions for at least one of the curves, each of the one or more probability distributions indicating a net present value for a particular item under evaluation.

7. The system of claim 1, wherein said data calculator generates at least one of the one or more curves for a first project under consideration, and generates at least one other of the one or more curves for a second project under evaluation, and wherein said data calculator is further for generating a bubble chart collectively for the first and the second project, wherein a horizontal axis of the bubble chart represents an expected project risk, a vertical axis of the bubble chart represents an expected project value, and a size of a respective bubble for each of the first and the second projects indicate a relative cost thereof.

8. The system of claim 1, wherein said graphical user interface allows a user to navigate over the grid on which the one or more curves are superimposed and enter new values for insertion into the one or more curves based at least on the current position of the pointer on the grid.

9. The system of claim 1, wherein said data calculator generates data for three views each corresponding to an item under evaluation from the user inputted values, wherein a first view comprises at least one triangular distribution for at least one of revenue, development cost, and maintenance cost, a second view comprises at least one probability distribution corresponding to at least one of the at least triangular distribution and indicating a net present value, and a third view comprises at least one bubble chart for indicating expected risk versus expected value.

10. The system of claim 9, wherein values in any of the views are directly manipulated based at least on the current position of the pointer on the grid.

11. A method, comprising:

respectively receiving user inputted values based on a current position of a pointer on a grid, the pointer corresponding to a graphical user interface, the graphical user interface having at least a display device with the grid and the pointer depicted thereon, the grid having a time axis and a value axis, the value axis representing a plurality of candidate values from which a user selects at least some of the user inputted values based on the current position of the pointer on the grid, the pointer being positionable by the user via the graphical user interface;

generating estimates based on the user inputted values;

creating three curves for display on the grid based on at least one of the user inputted values and the estimates, wherein the three curves comprise a first, a second, and a third curve representing a triangular distribution and respectively corresponding to expected values for a given item under evaluation, upper bounds with respect to the expected values, and lower bounds with respect to the expected values; and applying a direct manipulation, based at least on the current position of the pointer on the grid, to at least one of the user inputted values and the estimates, such that a result of the direct manipulation is displayed on the grid and enters triplets corresponding to an expected value, an upper bound for the expected value, and a lower bound for the expected value, based at least on the current position of the pointer on the grid.

12. The method of claim 11, where a result of the direct manipulation comprises a modification of at least one of the one or more curves.

13. The method of claim 11, wherein the triangular distribution comprises three triangular distributions respectively corresponding to revenue, development cost, and maintenance cost for a given project under evaluation, and the first curve, the second curve, and the third curve are respectively generated for each one of the three triangular distributions.

14. The method of claim 11, wherein said generating step comprises interpolating to generate the estimates to fill in smooth curve values in between another value and at least one of the user inputted values based on a flow between the other value and the at least one user inputted value.

15. The method of claim 14, wherein the other value is another one of the user inputted values.

16. The method of claim 11, further comprising generating one or more probability distributions for at least one of the curves, each of the one or more probability distributions indicating a net present value for a particular item under evaluation.

17. The method of claim 11, wherein said creating step create at least one of the one or more curves for a first project under consideration, and creates at least one other of the one or more curves for a second project under evaluation, and wherein the method further comprises generating a bubble chart collectively for the first and the second project, wherein a horizontal axis of the bubble chart represents an expected project risk, a vertical axis of the bubble chart represents an expected project value, and a size of a respective bubble for each of the first and the second projects indicate a relative cost thereof.

18. The method of claim 11, further comprising receiving additional user inputted values for insertion into the one or more curves based at least on the current position of the pointer on the grid.

19. The method of claim 11, further comprising generating data for three views each corresponding to an item under evaluation from the user inputted values, wherein a first view comprises at least one triangular distribution for at least one of revenue, development cost, and maintenance cost, a second view comprises at least one probability distribution corresponding to at least one of the at least triangular distribution and indicating a net present value, and a third view comprises at least one bubble chart for indicating expected risk versus expected value.

20. The method of claim 19, wherein values in any of the views are capable of direct manipulation based at least on the current position of the pointer on the grid.

21. A computer readable medium storing a computer readable program, wherein the computer readable program when executed on a computer causes the computer to perform the steps of:

respectively receiving user inputted values based on a current position of a pointer on a grid, the pointer corresponding to a graphical user interface, the graphical user interface having at least a display device with the grid and the pointer depicted thereon, the grid having a time axis and a value axis, the value axis representing a plurality of candidate values from which a user selects at least some of the user inputted values based on the current position of the pointer on the grid, the pointer being positionable by the user via the graphical user interface;

generating estimates based on the user inputted values;

creating three curves for display on the grid based on at least one of, the user inputted values and the estimates, wherein the three curves comprise a first, a second, and a third curve representing a triangular distribution and respectively corresponding to expected values for a given item under evaluation, upper bounds with respect to the expected values, and lower bounds with respect to the expected values; and applying a direct manipulation, based at least on the current position of the pointer on the grid, to at least one of the user inputted values and the estimates, such that a result of the direct manipulation is displayed on the grid and enters triplets corresponding to an expected value, an upper bound for the expected value, and a lower bound for the expected value, based at least on the current position of the pointer on the grid.

* * * * *